(12) United States Patent
Nufer et al.

(10) Patent No.: US 6,951,989 B2
(45) Date of Patent: Oct. 4, 2005

(54) BALANCE WITH A HEAT REMOVING DEVICE

(75) Inventors: Bruno Nufer, Illnau (CH); Stefan Buhler, Schwerzenbach (CH); Paul Luchinger, Uster (CH); Eduard Fringeli, Bubikon (CH)

(73) Assignee: Mettler-Toledo GmbH, Greifensee (CH)

( * ) Notice: Subject to any disclaimer, the term of this patent is extended or adjusted under 35 U.S.C. 154(b) by 159 days.

(21) Appl. No.: 10/654,781

(22) Filed: Sep. 4, 2003

(65) Prior Publication Data

US 2004/0104055 A1 Jun. 3, 2004

(30) Foreign Application Priority Data

Sep. 6, 2002 (EP) .............................................. 02102329

(51) Int. Cl.[7] .............................................. G01G 21/28
(52) U.S. Cl. .................................................... 177/180
(58) Field of Search .................................. 177/180–182, 177/238–244

(56) References Cited

U.S. PATENT DOCUMENTS

| 4,401,176 A | * | 8/1983 | Knothe et al. | .............. | 177/180 |
| 4,666,005 A | * | 5/1987 | Komoto et al. | .............. | 177/180 |
| 4,719,980 A | * | 1/1988 | Knothe et al. | .............. | 177/180 |
| 6,515,238 B1 | * | 2/2003 | Martens et al. | .............. | 177/180 |
| 6,633,007 B1 | * | 10/2003 | Luchinger et al. | .......... | 177/126 |
| 6,713,690 B2 | * | 3/2004 | Bierich et al. | .............. | 177/180 |

FOREIGN PATENT DOCUMENTS

| DE | 10031415 A | 1/2002 |
| JP | 59037426   | 2/1984 |
| JP | 02028522 A | 1/1990 |

* cited by examiner

Primary Examiner—Randy W. Gibson
(74) Attorney, Agent, or Firm—Standley Law Group LLP

(57) ABSTRACT

A balance (1) with a weighing pan (3) inside a weighing compartment (2) enclosed by a draft shield (4) has at least one thermoelectric module (16) that is arranged outside of the weighing compartment (2) and thermally connected to a stationary part of the balance (1). At least one vertical wall (8) of the draft shield (4) has a lower end portion in thermal connection with the thermoelectric module (16). The vertical wall (8) is configured in such a way that a temperature gradient develops in the vertical wall (8), wherein the temperature increases from the bottom to the top of the wall (8).

19 Claims, 3 Drawing Sheets

BALANCE WITH A HEAT REMOVING DEVICE

BACKGROUND OF THE INVENTION

The invention relates to a balance with a weighing pan surrounded on all sides by a weighing compartment that is delimited by a draft shield. At least one vertical wall of the draft shield is formed by a component of a stationary part of the balance. The balance has at least one thermoelectric module arranged outside of the weighing compartment and thermally connected to the stationary portion of the balance.

Balances of the kind used primarily in laboratories where stringent accuracy requirements must be met, for example analytical balances, often have the problem that the heat dissipation of the weighing-cell electronics and indicator electronics will warm up the air inside the weighing compartment while the draft shield is closed. When the draft shield is subsequently opened, for example to place an object on the weighing pan, the interaction with the outside air causes a relatively strong convective air current. Even after closing the draft shield, a convective air circulation will continue for some time inside the weighing compartment, causing the weighing result to remain unstable for a considerable length of time, in some cases until the convective circulation has returned to a stationary state. However, in most cases the air strata in the weighing compartment remain unstable, albeit only to a slight degree. As a rule, this will cause a continuous air circulation in the weighing compartment, so that the weighing result is subject to continuous, albeit slight fluctuations.

The German patent application DE 100 31 415 A1 discloses an analytical balance with a balance housing consisting of a housing base and a housing top, and with a balance pan surrounded on all sides by a draft shield that encloses a weighing compartment. The balance is equipped with a means for producing an upward-directed narrow stream of air in the weighing compartment or in a space connected to the weighing compartment. The purpose of the air stream is to create in the weighing compartment a temperature distribution that has a favorable effect on the weighing performance. According to the proposed concept, the favorable temperature distribution is achieved through a controlled small amount of stationary air circulation in the weighing compartment. The air stream can be generated in different ways according to different embodiments of the balance, for example by means of a heat source of compact dimensions that is attached to the upper half of the rear wall of the weighing compartment, or by means of an air duct running between an opening in the lower half and an opening in the upper half of the weighing compartment and containing an air-stream generating element. The air-stream generating element can be a fan or a heat source.

All of the embodiments described in DE 100 31 415 A1 have in common that they use an element which introduces an additional amount of heat into the balance which already carries the thermal load caused by intrinsic power dissipation. Consequently, the weighing compartment will be at a temperature that is predominantly above the ambient temperature, in some cases even by several degrees Celsius, and thus this concept fails to prevent the aforementioned air draft that occurs when the draft shield is opened. There is further the risk that any slight air circulation at or near the weighing pan will affect the weighing result, even if the circulation is intentionally created.

The Japanese patent JP 2 586 115 B discloses a balance in which the weighing compartment is temperature-controlled in such a way that the inside of the weighing compartment is at about the same temperature as the ambient air, thereby avoiding the problem of convective air currents when the draft shield is opened. This is accomplished by a thermoelectric module that is arranged outside the weighing compartment, preferably in the upper part of the balance housing. The thermoelectric module is in thermal contact with a cooling plate that runs along the wall or actually forms the wall separating the weighing compartment from the balance housing that contains the weighing-cell electronics. The purpose of the cooling plate is to keep the heat generated by the electronic components away from the weighing compartment, so that the air inside the weighing compartment will always be at the same temperature as the outside air. Thus, no temperature-induced convection occurs between the weighing compartment and surrounding space even when the draft shield is open. Likewise, no thermal effect on the weighing result is caused by bringing the weighing object from the outside into the weighing compartment, because the weighing container, the weighing sample itself, as well as the outside air enclosed in the weighing container are already at the same temperature as the inside of the weighing compartment.

However, based on the drawings of the Japanese patent JP 2 586 115 B, it is felt that the proposed arrangements of the thermoelectric module present problems of their own. The placement of the thermoelectric module, preferably in the upper part of the balance housing, may be adequate for the purpose of removing heat from a cooling plate that serves as a thermal shield for the electronic module, so that the temperature of the weighing compartment is approximately matched to the ambient temperature. However, the proposed solution is fraught with the risk of an unstable stratification of the air in the weighing compartment, as it tends to create a temperature distribution with colder air on top and warm air in the lower part of the weighing compartment. This has the inevitable consequence of a convective air circulation inside the weighing compartment, which in highly sensitive balances will manifest itself through fluctuations in the weighing result.

OBJECT OF THE INVENTION

It is therefore the object of the present invention to create a favorable air distribution in the weighing compartment and, if necessary, also in an adjacent measuring cell compartment, so that the air is stratified in a manner that is conducive to accurate weighing. In addition, the invention aims to almost completely rid the balance of the heat that is generated by the power dissipation of the electronic components of the balance.

SUMMARY OF THE INVENTION

The foregoing objective is achieved in a balance according to the invention, which has a weighing pan surrounded on all sides by a weighing compartment that is delimited by a draft shield, wherein at least one vertical wall of the draft shield is formed as a component of a stationary part of the balance. The balance has at least one thermoelectric module arranged outside of the weighing compartment and thermally connected to the stationary portion of the balance. The thermoelectric module is arranged near the stationary part of the balance in a lower portion of the balance. The bottom end of the at least one vertical wall is in thermal connection with the thermoelectric module, and the vertical wall is configured in a way that causes a temperature gradient in the vertical wall, so that the temperature increases from the bottom to the top of the wall.

The inventive arrangement allows the interior of the weighing compartment to be kept near ambient temperature. At the same time, a controlled temperature gradient is produced in the stationary, predominantly vertical wall, so that the temperature increases from the bottom to the top of the wall. The arrangement of the thermoelectric module and its thermal coupling to the balance are designed to produce a temperature gradient also in the weighing compartment, so that in a balance that is ready to operate, the temperature increases from the bottom to the top. This creates a stable stratification of the air in the weighing compartment, where even the opening and closing of the draft shield will have hardly any detrimental influence. The stable layering of the air prevents a convective air circulation, and thus there are no forces caused by air drafts acting on the weighing pan, so that the indicated weighing result remains stable.

The stationary part of the balance has a floor plate that is made of a material with good thermal conductivity, extends over the entire length of the balance, and is in intimate thermal connection with the thermoelectric module. In a preferred embodiment, the thermoelectric module is attached directly to the floor plate.

By lowering the temperature in the floor area of the balance, preferably by a few tenths to a few one-hundredths of a degree below ambient temperature, the desired stable air stratification is achieved inside the weighing compartment, at least as long as the draft shield is closed, so that the overall temperature in the weighing compartment is near ambient temperature, preferably a few tenths of a degree lower than ambient temperature near the floor and a few tenths of a degree higher than ambient temperature near the top of the weighing compartment. Thus, no convection takes place at least in the lower portion of the weighing compartment in the vicinity of the weighing pan, so that the weighing result remains stable.

If the stationary part of the balance includes a balance housing that surrounds a measuring cell compartment preferably to the rear of the weighing compartment, with the stationary vertical wall separating the weighing compartment from the measuring cell compartment, the air in the measuring cell compartment will likewise have a vertical temperature gradient and the air distribution will therefore remain largely stable and free of convection.

The temperature difference between the top and bottom ends of the stationary vertical wall and/or of the weighing compartment is not very high, but reaches at most 1° C., in particular about 0.5° C. If the balance has a measuring cell compartment as described above, it will also have the same temperature difference between top and bottom.

In a particularly preferred embodiment of the invention, the cold side of the thermoelectric module is connected to a heat-conducting body that is in contact with the stationary vertical wall and the floor plate. The heat-conducting body serves as a heat sink and thus ensures an effective heat removal from the balance.

To support the formation of a temperature gradient along the stationary wall, the weighing compartment and/or the measuring cell compartment, the electronic elements associated with the weighing cell are installed primarily in the upper half, in particular in the top third of the space inside the balance housing, so that the temperature gradient in the vertical wall will be enhanced by a heat flow that occurs from the electronic elements to the vertical wall. The stability of the temperature gradient in the vertical wall is ensured in particular by a specific design of the vertical wall, where its material thickness decreases from the bottom towards the top.

On the hot side of the thermoelectric module a heat sink is attached to promote a rapid removal of the heat into the ambient atmosphere.

In a preferred embodiment, the balance has an indicating- and operating unit which can be brought into thermal contact with the floor plate, so that a part of the heat generated by the power dissipation of the indicating- and operating unit is removed from the balance through the floor plate and in some configurations through the heat-conducting body and the thermoelectric module. On the other hand, the floor plate absorbs the heat from the indicating- and operating unit also by heat radiation and heat conduction through the air. The floor plate can also overlap some of the bottom portion of the draft shield front panel, and thus shield the weighing compartment from the heat radiation of the indicating- and operating unit.

In a further embodiment of the invention the front wall of the draft shield has a frame made preferably of metal and with good thermal contact with the floor plate, which serves as a shield against the heat radiated from the indicating- and operating unit and at the same time as a means of promoting the formation of a temperature gradient also in the front wall.

By removing the heat originating from the indicating- and operating unit, the weighing compartment is prevented from warming up in the area facing towards the indicating- and operating unit, so that the indicating- and operating unit can be installed with more flexibility to accommodate the requirements of a given application of the balance, in most cases irrespective of the amount of power dissipation.

BRIEF DESCRIPTION OF THE DRAWINGS

A detailed explanation of the inventive concept follows below with reference to an embodiment that is schematically illustrated in the drawing figures, wherein.

DETAILED DESCRIPTION OF A PREFERRED EMBODIMENT

Figure 1:
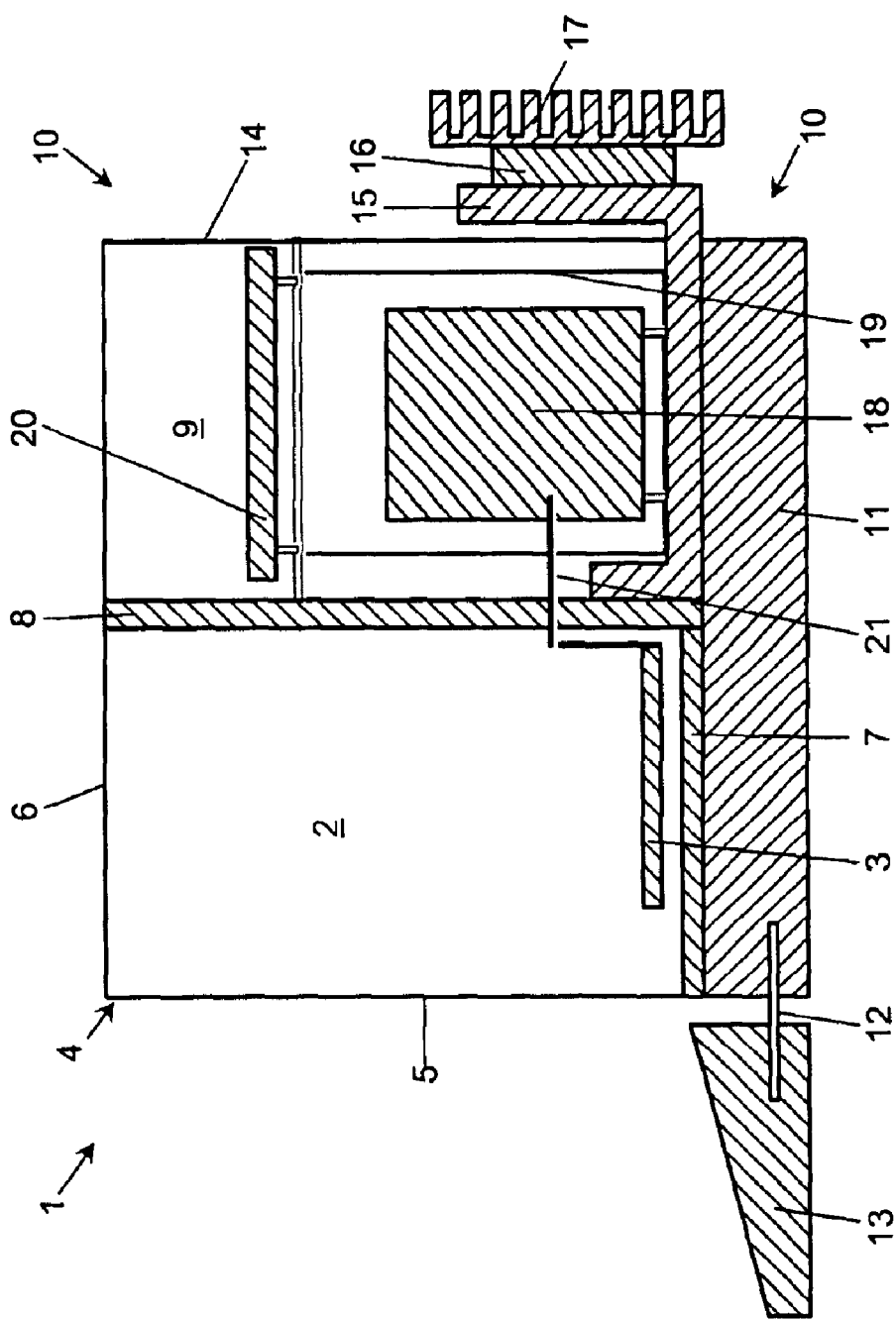
FIG. 1 illustrates a lengthwise sectional view of a balance with a thermoelectric module arranged outside the weighing compartment.

FIG. 1 shows a lengthwise sectional view of a balance of a type that is often used as an analytical balance for weighing minute amounts of materials in laboratories. The balance 1 has a weighing compartment 2 containing a weighing pan 3 and being surrounded by a draft shield 4. The latter has a preferably fixed front wall 5 and wall panels that are movable to open and close the weighing compartment 2. The movable wall panels include a top cover panel 6 delimiting the top side of the weighing compartment, and side wall panels (not visible in the drawing) delimiting the weighing compartment laterally. At the bottom and towards the rear (relative to the working position of the balance), the weighing compartment 2 is closed off by further parts of the draft shield enclosure 4, i.e., by a weighing compartment floor 7 and by a vertical wall, in the illustrated embodiment a separating wall 8 bordering on a measuring cell compartment 9. The measuring cell compartment 9 contains primarily the weighing cell 18, which is enclosed in a further, separate housing 19, and the weighing-cell electronics 20. The measuring cell compartment overall is surrounded by the balance housing 10, which also includes a floor plate 11 extending over the entire length of the balance 1. The floor plate 11 does not necessarily have to be a solid slab of material, but can also be configured as a hollow floor compartment containing for example a calibration mechanism (not illustrated). The floor plate 11 is in any event a supporting part of the balance housing 10. The front end of the floor plate is equipped with a fastening device 12 for an indicating- and operating unit 13. The latter is preferably separable from the balance housing 10.

The weighing pan 3 shown in the illustrated embodiment is connected to the weighing cell 18 by means of a cantilever 21 reaching through the separating wall 8.

A heat-conducting body 15 covering at least the floor of the measuring cell compartment 9 is solidly connected to the balance housing 10, in particular to the floor plate 11 and the separating wall 8, where the latter forms a part of the draft shield 4 as well as a part of the balance housing 10. A thermoelectric module 16, in particular a Peltier module, is connected in intimate thermal contact to the heat-conducting body 15, with the cold side of the thermoelectric module 16 facing towards the heat-conducting body 15. A heat sink 17 with cooling fins is attached to the hot side of the thermoelectric module 16 to promote a rapid heat exchange with the surrounding atmosphere.

The thermoelectric module 16 has the function of removing the dissipation-based heat from the balance 1 and pass it on to the outside air. Heat generators are primarily the weighing-cell electronics 20, arranged for the most part in the upper region of the measuring cell compartment 9, and an indicating- and operating unit 13 arranged predominantly in the frontal area of the balance. The thermoelectric module 16 is particularly effective in removing excess heat because of the intimate thermal connection to the heat-conducting body 15 and through the latter to the floor plate 11 and the separating wall 8. Thus, all parts of the balance 1, but in particular the weighing compartment 2 and the measuring cell compartment 9, are always kept at a temperature that is close to the temperature of the air surrounding the balance 1.

Arranging the thermoelectric module 16 in the lower part of the balance 1 has yet another useful effect. Particularly in cooperation with the weighing-cell electronics 20 in the upper half or top third of the measuring cell compartment 9, which acts as a heat source on the separating wall 8, and also due to the design of the separating wall 8 itself (see below), a temperature gradient can be set up in the separating wall 8 with a desired temperature increase from the bottom to the top of the separating wall 8. The temperature difference between the upper and lower parts of the separating wall 8 can reach as much as 1° C. but are preferably around 0.5° C. The temperature profile of the separating wall 8 is also shared by the air on both sides of the separating wall. As a consequence, the air in the weighing compartment 2 and also in the measuring cell compartment 9 takes on a stable stratified distribution in which the temperature increases from the bottom to the top. This situation is promoted in particular by the fact that the floor plate 11 is in contact with the heat-conducting body 15 and thereby held likewise at a somewhat lower temperature. The temperature of the floor plate 11 may be below the ambient temperature by a few tenths of a degree, substantially no more than one half degree Celsius.

Due to the stable stratification, an air circulation in the weighing compartment 2 as well as in the measuring cell compartment 9 is to a large extent prevented. Inside the weighing compartment, the air is calm in particular in the vicinity of the weighing pan 3, where due to the cooled floor plate 11, the temperature-stabilized air strata extend over the entire horizontal area.

The overall dimensions of the heat-removal arrangement and the power of the thermoelectric module 16 are selected so that the net heat flow for the balance 1 is around zero. Consequently, the balance 1 overall is close to the ambient temperature, with the floor area of the balance being for the most part slightly below ambient temperature and the parts near the cover panel 6 being lightly above ambient temperature.

Figure 2:
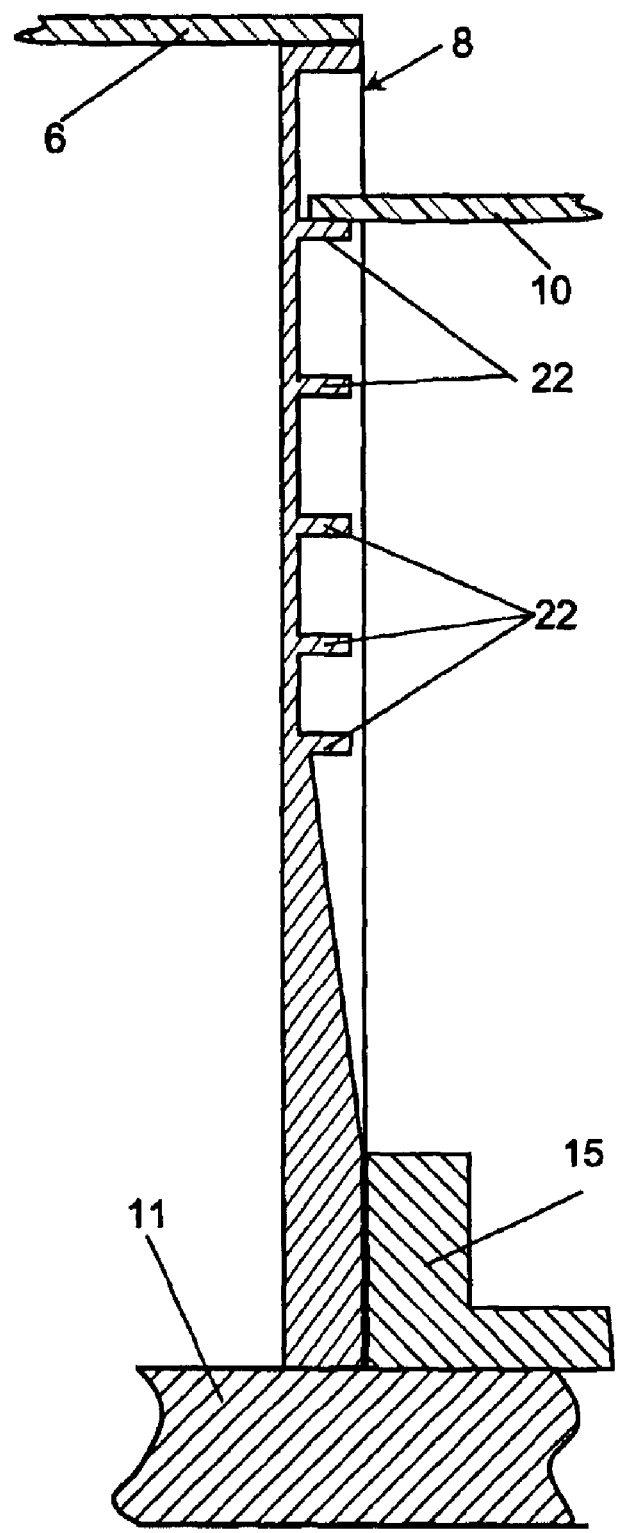
FIG. 2 represents a cross-section of the separating wall between the weighing compartment and the measuring cell compartment of the balance, i.e., the wall in which a temperature gradient occurs.

FIG. 2 gives a sectional view of the separating wall 8 in an embodiment that could be produced for example as an aluminum casting. This shape is particularly favorable to the formation of a stable temperature gradient in the separating wall 8. While the bottom portion of the separating wall 8, which is in contact with the heat-conducting body 15 and the floor plate 11, consists of a solid slab of material, the wall thickness tapers down towards the top. The top portion of the separating wall has a considerably reduced thickness, about one-fifth of the bottom portion, and the wall is reinforced in the top portion by transverse ribs 22. The tapered shape of the separating wall 8 decreases the heat-conducting ability of the wall with increasing height. The decrease in heat conduction in conjunction with the cooled floor plate 11 and especially the cooling of the heat-conducting body 15 combined with the heating of the upper portion by the weighing-cell electronics promotes the formation of a stable temperature gradient. The cover panel 6 that rests on the upper border of the separating wall 8 is preferably made of glass, and the rearward portion of the balance housing 10 which abuts one of the transverse ribs 22 is made of a polymer material.

Figure 3:
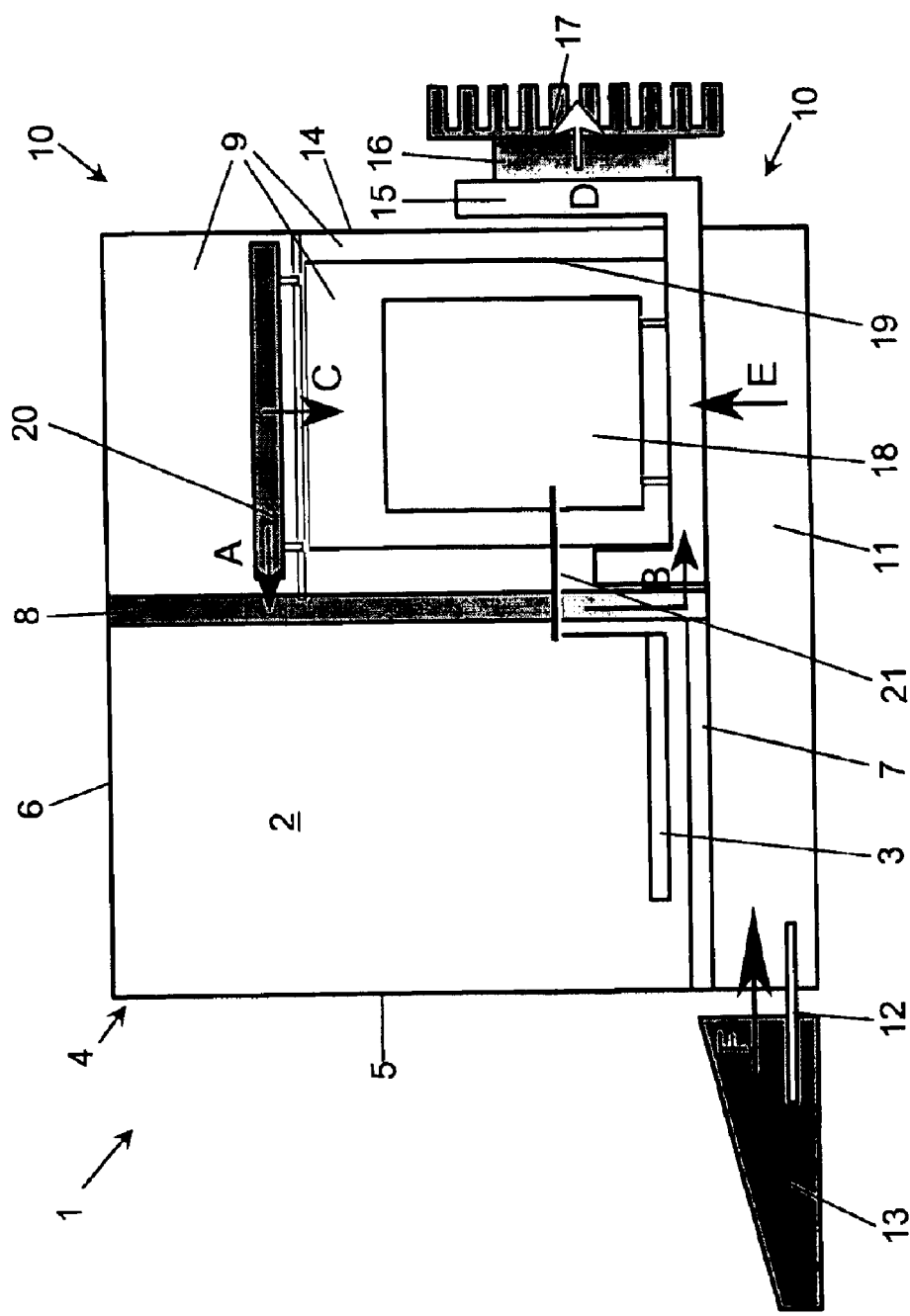
FIG. 3 represents the balance of FIG. 1 with an illustration of the temperature distribution and the heat flow that occur during operation of the balance.

FIG. 3 gives a schematic representation of the heat flow in the balance 1 in a lengthwise sectional view analogous to FIG. 1. The high-temperature areas or heat sources are shown in a dark grey tone while the low-temperature areas or heat sinks are shown in a light grey tone. The arrows A through F indicate the direction of heat flow. An inflow of heat occurs at the upper portion of the separating wall 8 (arrow A), while an outflow takes place at the lower end (arrow B). FIG. 3 visualizes in particular the temperature gradient along the separating wall 8 which, as mentioned above, builds up on the one hand as a result of the weighing-cell electronics 20 being arranged on top and working as a heat source and on the other hand due to the floor plate 11 working as a heat sink. The stability of the temperature gradient is helped by the design of the separating wall according to FIG. 2 or a similar configuration with a wall thickness that decreases from the bottom to the top of the wall.

A part of the power dissipated by the weighing-cell electronics 20 is let off (see arrow C) into the air space above the weighing cell 18, where it contributes to a particularly stable air stratification in the measuring cell compartment 9, i.e., a convection-free air distribution, as the lower end of the measuring cell compartment 9 is formed by the heat-conducting body 15, so that a desired temperature gradient develops in this area. The heat-conducting body 15, which is connected to the cold side of the thermoelectric module 16, is made of a material with good thermal conductivity, for example aluminum, so that the heat-conducting body 15 shares the temperature of the cold side of the thermoelectric module 16. The hot side of the thermoelectric module 16 communicates with the surrounding atmosphere through a heat sink 17 equipped with cooling fins to release the waste heat of the balance as well as the internally generated waste heat of the thermoelectric module into the surrounding air as indicated by the white arrow D which illustrates the function of the thermoelectric module 16 as a heat pump. It is also conceivable to use an active element such as a fan at this place in the system to carry away the heat from the hot side of the thermoelectric module 16 into the surrounding atmosphere.

The indicating- and operating unit 13 represents another heat source. With the increasing use of programmable balances, the design of an indicating- and operating unit for a balance is an increasingly important factor. Particularly in demand are indicating- and operating units with large, actively backlit user interface areas. However, these units use more energy and accordingly dissipate more power than conventional indicating- and operating units. The waste heat resulting from the power dissipation of the indicating- and operating unit 13 can, however, have an effect on the thermal situation in the weighing compartment 2 in the sense that the indicating- and operating unit acts as a heat source in the lower portion of the front wall 5 and warms up the adjoining air in the weighing compartment 2. Of course, this is very detrimental to a stable stratified air distribution.

In order to prevent the convective circulation in the weighing compartment 2 due to the heat originating from the indicating- and operating unit, the heat is carried away through the floor plate 11 which is thermally coupled to the heat-conducting body 15 (see arrow E) and therefore kept at substantially the temperature of the heat-conducting body 15. Thus, a heat flow takes place (see arrow F) from the indicating- and operating unit 13 into the floor plate 11, where part of the heat is conducted through the fastening device 12 and another part through the air, and some of the heat is also transmitted by radiation. Thus, the indicating- and operating unit 13 no longer functions as a heat source affecting the air in the lower part of the weighing compartment 2. The entire floor 7 of the weighing compartment 2 is cooled by means of the floor plate 11, so that the air strata near the floor are at a temperature approximately equal to the ambient temperature, preferably a few tenths of a degree lower. This contributes to a convection-free stratified air distribution inside the weighing compartment 2, at least in the vicinity of the weighing pan 3.

It is conceivable to provide the front wall 5 of the weighing compartment 2 with a frame, consisting for example of a metal, and to thereby achieve a thermal coupling of the front wall 5 to the floor plate 11. Thus, a temperature gradient occurs also in the front wall 5, preferably in the vertical direction, which also has the effect of shielding the weighing compartment 2 against the heat that is generated by power dissipation in the indicating- and operating device 13 and carried into the weighing compartment by radiation and/or convection of the outside air As another design option, the lower end of the front wall 5 can be equipped with a heat barrier (not shown in the drawing) that is thermally coupled to the floor plate 11 and thus, like the preceding measure, protects the weighing compartment 2 against the heat originating from the indicating- and operating unit 13. Further special designs of the front wall 5 are conceivable, where the thermal shielding of the weighing compartment 2 against the indicating- and operating unit 13 is achieved by making the front wall 5 of a special glass with a sufficiently large thermal conductivity, so that the bottom portion of the front wall 5 is kept cooler because of its connection to the cooled floor plate 11.

As is self-evident, a thermoelectric module 16 in a balance could also be arranged in a different place of the floor plate 11 instead of the illustrated location near the lower portion of the rear wall 14 of the measuring cell compartment 9. It is for example conceivable to arrange a thermoelectric module below the floor plate 11 or at a lateral location of the floor plate 11, for example below each of the side walls of the weighing compartment 2. It is in any event advisable to arrange the thermoelectric module 16 in the lower part of the balance 1, with the cold side of the thermoelectric module contacting primarily a supporting part of the balance 1.

In some known balances, the weighing cell and associated electronics are arranged in a measuring cell compartment below the floor of the weighing compartment. In a balance of this type, a thermoelectric module can likewise be used to good advantage as a heat-removing device, for example by attaching the thermoelectric module to the measuring cell compartment that forms the stationary part of the balance, with the cold side of the module contacting the measuring cell compartment. Preferably, the thermoelectric module in this arrangement also has intimate thermal contact with the weighing compartment floor, so that the temperature gradient which develops in the substantially vertical stationary wall is also shared by the air in the weighing compartment, whereby a stable stratified air distribution is ensured. It may in some cases be necessary to assist the formation of a stable temperature gradient in the weighing compartment and in at least one of the weighing compartment walls by a slight heating of the upper portion of one or more of the weighing compartment walls. This can be accomplished by arranging a heating element at the wall portion to be heated, or by directing warm air to that wall portion from the hot side of the thermoelectric module.

LIST OF REFERENCE SYMBOLS

1 balance
2 weighing compartment
3 weighing pan
4 draft shield
5 front wall
6 top cover panel
7 weighing compartment floor
8 vertical fixed wall, separating wall
9 measuring cell compartment
10 balance housing
11 floor plate
12 fastening device
13 indicating- and operating unit
14 rear wall
15 heat-conducting body
16 thermoelectric module
17 heat sink
18 weighing cell
19 housing of the weighing cell
20 weighing-cell electronics
21 cantilever
22 transverse rib
A arrow indicating heat flow
B arrow indicating heat flow
C arrow indicating heat flow
D arrow indicating heat flow
E arrow indicating heat flow
F arrow indicating heat flow

What is claimed is:

1. A balance (1), comprising a weighing pan (3), a weighing compartment (2) surrounding the weighing pan on all sides, a draft shield (4) enclosing the weighing compartment, and a stationary part, wherein the draft shield has at least one vertical wall (8) formed as a component of the stationary part, wherein at least one thermoelectric module (16) is arranged outside of the weighing compartment (2) near the stationary part in a lower portion of the balance and thermally connected to the stationary part, wherein the at least one vertical wall (8) has a lower end portion in thermal connection with the thermoelectric module (16), and wherein the at least one vertical wall (8) is configured in such a way that a temperature gradient with a bottom-to-top temperature increase develops in said at least one vertical wall (8).

2. The balance (1) according to claim 1, wherein the stationary part of the balance has a floor plate (11) extending over the entire length of the balance (1) and consisting of a material with good thermal conductivity, said floor plate (11) being in thermal connection with the at least one thermoelectric module (16).

3. The balance (1) according to claim 1, wherein the stationary part includes a measuring cell compartment (9) and a balance housing (10) surrounding the measuring cell compartment, and wherein the at least one vertical wall (8) is configured as a separating wall between the weighing compartment (2) and the measuring cell compartment (9).

4. The balance (1) according to claim 3, wherein the measuring cell compartment (9) contains air with a vertical air temperature gradient with a bottom-to-top temperature increase.

5. The balance (1) according to claim 1, wherein the weighing compartment (2) at least near the weighing pan (3) contains air with a vertical air temperature gradient with a bottom-to-top temperature increase.

6. The balance (1) according to claim 1, wherein respective temperatures in an upper end and a lower end of at least one of the at least one vertical wall (9) and the weighing compartment (2) differ by substantially no more than 1° C.

7. The balance (1) according to claim 6, wherein said respective temperatures differ by substantially no more than 0.5° C.

8. The balance (1) according to claim 3, wherein respective temperatures in an upper end and a lower end of the measuring cell compartment (9) differ by substantially no more than 1° C.

9. The balance (1) according to claim 8, wherein said respective temperatures differ by substantially no more than 0.5° C.

10. The balance (1) according to claim 2, wherein the floor plate (11) has a temperature that is no higher than a few tenths of a degree Celsius above ambient temperature, substantially no more than one half degree Celsius.

11. The balance (1) according to claim 10, wherein said temperature is a few tenths of a degree Celsius below ambient temperature, substantially no more than one half degree Celsius.

12. The balance (1) according to claim 2, wherein the at least one thermoelectric module (16) has a hot side and a cold side and is attached to the floor plate (11) with the cold side facing towards the floor plate (11) and the hot side facing towards an outside environment of the balance.

13. The balance (1) according to claim 2, further comprising a heat-conducting body (15) connected to the floor plate (11) and the vertical wall (8), wherein the at least one thermoelectric module (16) has a hot side and a cold side and is attached to the heat-conducting body (15) with the cold side facing towards the heat-conducting body (15) and the hot side facing towards an outside environment of the balance.

14. The balance (1) according to claim 1, further comprising a heat sink (17) connected to a hot side of the at least one thermoelectric module (16) to provide a rapid heat removal into ambient air.

15. The balance (1) according to claim 3, wherein the measuring cell compartment (9) comprises a weighing-cell electronics (20) module arranged in an upper half of the measuring cell compartment (9), so that a heat flow is generated from the weighing cell electronics (20) to the at least one vertical wall (8) and said heat flow enhances the temperature gradient in the stationary vertical wall.

16. The balance (1) according to claim 15, wherein said electronics (20) module is arranged in the top third of the measuring cell compartment (9).

17. The balance (1) according to claim 1, wherein the at least one vertical wall (8) has a material thickness that decreases in the bottom-to-top direction.

18. The balance (1) according to claim 1, further comprising an indicating- and operating unit (13) which can be brought into thermal contact with the floor plate (11) to remove heat caused by power dissipation of the indicating- and operating unit (13).

19. The balance (1) according to claim 1, wherein the draft shield (4) comprises a front wall (5) with a metallic frame that is connected to the floor plate (11).

* * * * *